(12) United States Patent
Ponda et al.

(10) Patent No.: US 10,875,618 B2
(45) Date of Patent: Dec. 29, 2020

(54) AERIAL VEHICLE CONTROL USING BALLAST

(71) Applicant: LOON LLC, Mountain View, CA (US)

(72) Inventors: Sameera S. Ponda, Mountain View, CA (US); Salvatore J. Candido, Mountain View, CA (US); Jacob Roberts, San Francisco, CA (US)

(73) Assignee: LOON LLC, Mountain View, CA (US)

( * ) Notice: Subject to any disclaimer, the term of this patent is extended or adjusted under 35 U.S.C. 154(b) by 446 days.

(21) Appl. No.: 15/850,612

(22) Filed: Dec. 21, 2017

(65) Prior Publication Data

US 2019/0193828 A1 Jun. 27, 2019

(51) Int. Cl.
*B64B 1/70* (2006.01)
*B64B 1/62* (2006.01)
*B64B 1/44* (2006.01)

(52) U.S. Cl.
CPC .............. *B64B 1/70* (2013.01); *B64B 1/44* (2013.01); *B64B 1/62* (2013.01)

(58) Field of Classification Search
CPC ................ B64B 1/70; B64B 1/44; B64B 1/62
USPC ............................................................. 701/3
See application file for complete search history.

(56) References Cited

U.S. PATENT DOCUMENTS

| 6,628,941 | B2 | 9/2003 | Knoblach et al. |
|---|---|---|---|
| 7,203,491 | B2 | 4/2007 | Knoblach et al. |
| 7,356,390 | B2 | 4/2008 | Knoblach et al. |
| 7,469,857 | B2 | 12/2008 | Voss |
| 7,801,522 | B2 | 9/2010 | Knoblach et al. |
| 8,820,678 | B2 | 9/2014 | DeVaul et al. |
| 8,825,232 | B2 | 9/2014 | Knoblach et al. |
| 8,967,533 | B2 | 3/2015 | DeVaul et al. |
| 9,139,279 | B2 | 9/2015 | Heppe |
| 9,296,461 | B1 | 3/2016 | Roach |
| 9,329,600 | B2 | 5/2016 | DeVaul et al. |
| 9,409,646 | B2 | 8/2016 | Fleck |
| 9,418,243 | B2 | 8/2016 | Bauer et al. |
| 9,419,902 | B1 | 8/2016 | Sites |
| 9,420,023 | B2 | 8/2016 | Ramamurthy et al. |
| 9,519,045 | B2 | 12/2016 | Knoblach et al. |
| 9,632,503 | B2 | 4/2017 | Knoblach et al. |
| 9,836,063 | B1 | 12/2017 | Bonawitz et al. |
| 2010/0004798 | A1* | 1/2010 | Bodin .................. G05D 1/0044 701/2 |
| 2010/0198514 | A1* | 8/2010 | Miralles ............... G08G 5/0069 701/302 |

(Continued)

FOREIGN PATENT DOCUMENTS

WO 2017/213706 A1 12/2017

*Primary Examiner* — Gertrude Arthur Jeanglaude
(74) *Attorney, Agent, or Firm* — Marton Ribera Schumann & Chang LLP; Chien-Ju Alice Chuang; Hector J. Ribera

(57) ABSTRACT

A system for controlling an aerial vehicle includes an aerial vehicle, a ballast coupled to the aerial vehicle, a server including a processor and a memory, and a wireless communication link that communicatively couples the aerial vehicle and the server. the memory stores instructions that, when executed by the processor, cause the server to receive weather data, determine, based on the weather data, that the aerial vehicle is experiencing, or is expected to experience, weather that satisfies a predetermined criterion, and cause the aerial vehicle to decouple at least a portion of the ballast based on a result of the determination.

20 Claims, 6 Drawing Sheets

(56) References Cited

U.S. PATENT DOCUMENTS

2010/0230968 A1    9/2010   Chernyshov  
2014/0032034 A1*   1/2014   Raptopoulos ........ G05D 1/0088  
                                                                            701/25

\* cited by examiner

AERIAL VEHICLE CONTROL USING BALLAST

BACKGROUND

Some aerial vehicles float at a preferred altitude by using a trapped lifting gas to maintain a pressure differential between a pressure inside the aerial vehicle and an ambient air pressure outside the aerial vehicle. The pressure differential, however, is susceptible to ambient weather conditions. In adverse weather conditions, for example, the internal temperature and pressure of the aerial vehicle drop and, if they drop low enough, the aerial vehicle may enter thermal runaway and begin to descend below the preferred altitude. In some instances, conventional aerial vehicle lift systems, without more, may be insufficient to compensate for significant changes in weather conditions. As such, advancements in aerial vehicle pressure differential management could be beneficial in improving their resilience in the face of adverse weather conditions.

SUMMARY

In one aspect, this disclosure describes a system for controlling an aerial vehicle. The system includes an aerial vehicle, a ballast coupled to the aerial vehicle, and a server communicatively coupled to the aerial vehicle by means of a wireless communication link, the server including a processor and a memory. The memory stores instructions which, when executed by the processor, cause the server to receive weather data, determine, based on the weather data, that the aerial vehicle is experiencing, or is expected to experience, weather that satisfies a predetermined criterion, and cause the aerial vehicle to decouple at least a portion of the ballast based on a result of the determination.

In embodiments, the determining that the aerial vehicle is experiencing, or is expected to experience, weather that satisfies the predetermined criterion includes determining that a temperature metric included in the weather data is below a predetermined threshold.

In embodiments, the instructions, when executed by the processor, further cause the server to determine the portion of the ballast to decouple based on an amount by which the temperature metric is below the predetermined threshold.

In embodiments, the determining of the portion of the ballast to decouple is further based on an altitude of the aerial vehicle.

In embodiments, the predetermined threshold is determined based on an altitude of the aerial vehicle and an amount of gas inside the aerial vehicle.

In embodiments, the determining that the aerial vehicle is experiencing, or is expected to experience, weather that satisfies the predetermined criterion includes determining that a temperature of gas inside the aerial vehicle is expected to cause the aerial vehicle to experience zero superpressure.

In embodiments, determining that the temperature of gas inside the aerial vehicle is expected to cause the aerial vehicle to experience zero superpressure includes determining that a level of infrared radiation experienced at an altitude of the aerial vehicle is expected to cause a temperature of the gas inside the aerial vehicle to drop below a predetermined threshold.

In embodiments, the predetermined threshold is determined based on an amount of gas inside the aerial vehicle.

In embodiments, the instructions, when executed by the processor, further cause the server to determine the portion of the ballast to decouple based on an amount of gas inside the aerial vehicle.

In embodiments, the determining of the portion of the ballast to decouple is further based on the altitude of the aerial vehicle.

In embodiments, the instructions, when executed by the processor, further cause the server to determine whether the aerial vehicle is expected to recover from experiencing zero superpressure.

In embodiments, the instructions, when executed by the processor, further cause the server to determine an altitude to which the aerial vehicle is expected to descend while the aerial vehicle experiences zero superpressure.

In embodiments, the instructions, when executed by the processor, further cause the server to determine whether the altitude to which the aerial vehicle is expected to descend while the aerial vehicle experiences zero superpressure is above a minimum altitude.

In embodiments, the instructions, when executed by the processor, further cause the server to cause the aerial vehicle to descend to the ground prior to experiencing zero superpressure in response to a determination that the altitude to which the aerial vehicle is expected to descend while the aerial vehicle experiences zero superpressure is not above the minimum altitude.

In embodiments, the weather data is received from an external source.

In embodiments, the weather data is received from a sensor coupled to the aerial vehicle.

In embodiments, the aerial vehicle includes a balloon.

In embodiments, the ballast is composed of a granular substance.

In another aspect, the present disclosure describes a method for controlling an aerial vehicle. The method includes receiving weather data, determining, based on the weather data, that an aerial vehicle is experiencing, or is expected to experience, weather that satisfies a predetermined criterion, and causing the aerial vehicle to decouple at least a portion of a ballast coupled to the aerial vehicle based on a result of the determination.

In another aspect, the present disclosure describes a non-transitory computer-readable storage medium storing instructions which, when executed by a processor, cause a computing device to receive weather data, determine, based on the weather data, that an aerial vehicle is experiencing, or is expected to experience, weather that satisfies a predetermined criterion, and cause the aerial vehicle to decouple at least a portion of a ballast coupled to the aerial vehicle based on a result of the determination.

BRIEF DESCRIPTION OF THE DRAWINGS

Various aspects and features of the present systems and methods for controlling an aerial vehicle are described herein below with references to the drawings, wherein.

DETAILED DESCRIPTION

Figure 1:
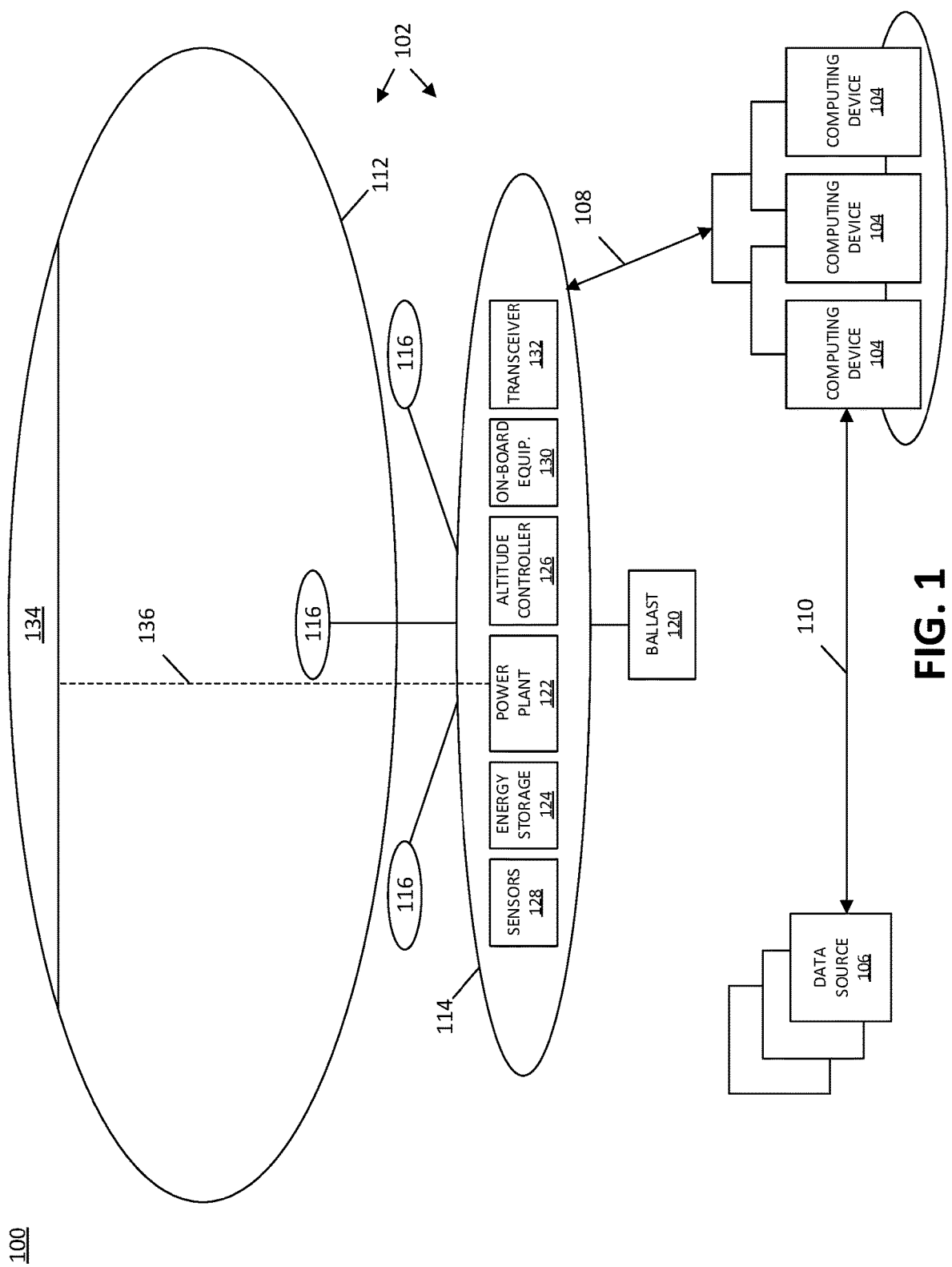
FIG. 1 is a schematic diagram of an illustrative aerial vehicle system, in accordance with an embodiment of the present disclosure.

The present disclosure is directed to systems and methods for controlling vertical movement of an aerial vehicle using a combination of an air-gas lift mechanism and a ballast. In one aspect, the systems and methods of the present disclosure enable an aerial vehicle to compensate for changes in ambient weather conditions by adjusting the air-gas lift mechanism and/or decoupling ballast to effect a vertical maneuver and maintain a desired pressure differential, thereby ensuring safe operation of the aerial vehicle, even in the face of adverse weather. In some examples, the systems and methods of the present disclosure facilitate maneuvers that enable the aerial vehicle to evade adverse weather that might otherwise prevent the aerial vehicle from remaining airborne, thereby extending the operational airborne lifetime of the aerial vehicle. The systems and methods of the present disclosure, in some aspects, enable a control system of an aerial vehicle to determine, based on predicted and/or detected weather conditions, whether the aerial vehicle will be able to maintain a safe altitude during flight. The control system of the aerial vehicle may further determine whether the aerial vehicle has sufficient lifting gas and/or ballast remaining to maintain a safe altitude during predicted weather conditions, and cause the aerial vehicle to make a controlled descent to the ground if it is determined that the aerial vehicle does not have sufficient lifting gas and/or ballast remaining to maintain the safe altitude.

While various types and forms of aerial vehicles are envisioned by the present disclosure, including balloons, dirigibles, blimps, other vehicles that maintain altitude at least in part by using buoyancy, and/or the like, the present disclosure will use a superpressure balloon as an illustrative aerial vehicle. Superpressure balloons are designed to float at an altitude in the atmosphere where the density of the balloon system is equal to the density of the atmosphere. Higher atmospheric levels have lower density, and lower atmospheric levels have higher density. On the other hand, the balloon's density corresponds to the mass of the balloon system (including everything coupled to it) divided by the total volume of the balloon. Additionally, for a superpressure balloon to float, the pressure inside the balloon must be greater than the pressure outside the balloon (referred to hereinbelow as the "ambient pressure") such as to generate a force pushing outward on the balloon's structure to retain the balloon's volume at a roughly constant level. If the pressure inside the balloon is not greater than the pressure outside the balloon, the volume of the balloon will contract and the density of the balloon system will increase, thus causing the balloon to lose altitude and drop to an atmospheric level where the balloon system again has the same density as the surrounding air. This condition is referred to hereinbelow as the balloon experiencing "zero superpressure."

The mass of the balloon is adjustable by way of an altitude control system (ACS) configured to pump a gas, such as air, into the balloon and out of the balloon, as described below. Thus, the density of the balloon, and correspondingly the altitude at which the balloon will float, is adjustable, at least to some extent, by way of the ACS. In some instances, a balloon experiencing zero superpressure will lose altitude but remain afloat at a lower atmospheric level where the density of the balloon system and the density of the surrounding air is again matched, i.e., the balloon would regain superpressure at that lower atmospheric level. During severe weather conditions, for example during severely cold ambient temperatures and/or in conditions where upwelling infrared energy from the surface of the Earth is obstructed by severe cloud cover, the air inside the balloon may compress by such a large amount that the volume of the balloon can no longer be maintained, and the density of the balloon system increases beyond a level where the balloon is able to stay afloat at a safe altitude. Such situations are referred to hereinbelow as a "thermal runaway," and this may cause the balloon system to drop below a safe altitude or even all the way to the ground. In such situations where the air inside the balloon is colder than the ambient air temperature, the ACS may be used to decrease the amount of gas inside the balloon (e.g., decrease an amount of air inside ballonets) to decrease the mass and density of the balloon system to repressurize and the balloon to float at a higher altitude.

The volume of any given quantity (e.g., a mole) of gas depends in part on the temperature of the gas. For example, assuming a pressure of the gas remains constant, increasing the temperature of the gas causes the volume of the gas to expand. Similarly, assuming the pressure of the gas remains constant, decreasing the temperature of the gas causes the volume of the gas to contract. This is taken into consideration when determining the amount of lifting gas needed to maintain superpressure in a balloon, because if the temperature of the lifting gas is decreased, the volume of the lifting gas will contract, and thus more lifting gas will be needed to maintain superpressure in the balloon. The pressure inside a balloon, or inside the portion of a balloon occupied by a lifting gas, can be determined according to the laws of thermodynamics, such as by using the ideal gas law, i.e., the formula $PV=nRT$, where P is the pressure inside the portion of the balloon occupied by a lifting gas (measured in Pascals, for example), n is the amount of lifting gas inside the balloon (measured in moles, for example), R is a constant (for this example, 8.3144621 Joules/(moles*Kelvin), T is the absolute temperature of the lifting gas inside the balloon (measured in units Kelvin, for example) and V is the volume of the portion of the balloon (measured in cubic meters, for example) occupied by the lifting gas. By solving for the various variables in this formula, the pressure of the lifting gas inside the balloon, the amount of gas inside the balloon, the volume of the balloon, and/or the temperature of the gas inside the balloon may be calculated for various temperatures, pressures, and/or amounts of gas. The altitude at which the balloon floats depends the volume of the balloon and the mass of the total balloon system temperature of the air inside the balloon, which causes the air inside the balloon expand or compress, thereby increasing or decreasing the density of the balloon system. The ambient pressure at a particular altitude varies day to day and based on location due to differences in the density of the atmosphere. The ambient pressure at a particular altitude may be determined based on barometric measurements, and/or may be calculated based various models of atmospheric pressure, such as, for example, the International Standard Atmosphere model. Thus, the altitude at which the balloon will float may also be calculated based on the above-noted formula by first solving for the temperature of the air inside the balloon, determining, based on the temperature of the air inside the balloon, whether the pressure of the air inside the balloon is sufficient to maintain the balloon at maximum volume (i.e. will the balloon maintain superpressure), and then calculating the corresponding altitude at which the density of the balloon system will be equal to the ambient air density.

With reference to FIG. 1, an illustrative aerial vehicle control system 100 includes an aerial vehicle 102, one or more computing devices 104, and one or more data sources 106, not drawn to scale. The aerial vehicle 102 and the computing devices 104 are communicatively coupled to one another by way of a wireless communication link 108, and the computing devices 104 and the data sources 106 are communicatively coupled to one another by way of wired and/or wireless communication link 110. In some aspects, the aerial vehicle 102 is configured to be launched into and moved about the atmosphere, and the computing devices 104 cooperate as a ground-based distributed array to perform their functions described herein. The data sources 106 may include airborne data sources, such as airborne weather balloons, additional airborne aerial vehicles 102, and/or the like, and/or ground-based data sources, such as publicly available and/or proprietary databases, examples of which are the Global Forecast System (GFS) operated by the National Oceanic and Atmospheric Administration (NOAA), as well as databases maintained by the European Center for Medium-range Weather Forecasts (ECMWF). Although the present disclosure is provided in the context of an embodiment where the system 100 includes multiple computing devices 104 and multiple data sources 106, in other embodiments the system 100 may include a single computing device 104 and a single data source 106. Further, although FIG. 1 shows a single aerial vehicle 102, in various embodiments the system 100 includes a fleet of multiple aerial vehicles 102 that are positioned at different locations throughout the atmosphere and that are configured to communicate with the computing devices 104, the data sources 106, and/or one another by way of the communication links 108 and/or 110.

In various embodiments, the aerial vehicle 102 may be configured to perform a variety of functions or provide a variety of services, such as, for instance, telecommunication services (e.g., long term evolution (LTE) service), hurricane monitoring services, ship tracking services, services relating to imaging, astronomy, radar, ecology, conservation, and/or other types of functions or services. Computing devices 104 control the position (also referred to as location) and/or movement of the aerial vehicles 102 throughout the atmosphere or beyond, to facilitate effective and efficient performance of their functions or provision of their services, as the case may be. As described in further detail herein, the computing devices 104 are configured to obtain a variety of types of data from a variety of sources and, based on the obtained data, communicate messages to the aerial vehicle 102 to control its position and/or movement during flight.

With continued reference to FIG. 1, the aerial vehicle 102 includes a lift gas balloon 112, one or more ballonets 116, and a payload or gondola 114, which is suspended beneath the lift gas balloon 112 and/or the ballonets 116 while the aerial vehicle 102 is in flight. The ballonets 116, as described in further detail below, are used to control the buoyancy, and thereby the altitude, of the aerial vehicle 102 during flight. In some aspects, the ballonets 116 include air and the lift gas balloon 112 includes a lifting gas that is lighter than air. As shown in FIG. 1, the ballonets 116 may be positioned inside the lift gas balloon 112 and/or outside the lift gas balloon 112. An altitude controller 126 controls a pump and a valve (neither of which are shown in FIG. 1) to pump air into the ballonets 116 (from air outside the aerial vehicle 102) to increase the mass of the aerial vehicle 102 and lower its altitude, or to release air from the ballonets 116 (into the atmosphere outside the aerial vehicle 102) to decrease the mass of the aerial vehicle 102 and increase its altitude. The combination of the altitude controller 126, the lift gas balloon 112, the ballonets 116, and the valves and pumps (not shown in FIG. 1) may be referred to as an air-gas altitude control system (ACS).

The aerial vehicle 102 also has one or more solar panels 134 affixed thereto. As shown in FIG. 1, the solar panels 134 may be affixed to an upper portion of the lift gas balloon 112 that absorbs sunlight, when available, and generate electrical energy from the absorbed sunlight. Alternatively, or in addition, the solar panels 134 may be affixed to the gondola 114 or elsewhere to aerial vehicle 102 (not shown in FIG. 1). The solar panels 134 provide, by way of power paths such as power path 136, the generated electrical energy to the various components of the aerial vehicle 102, such as components housed within the gondola 114, for utilization during flight.

The gondola 114 includes a variety of components, some of which may or may not be included, depending upon the application and/or needs. Although not expressly shown in FIG. 1, the various components of the aerial vehicle 102 in general, and/or of the gondola 114 in particular, may be coupled to one another for communication of power, data, and/or other signals or information. The example gondola 114 shown in FIG. 1 includes one or more sensors 128, an energy storage module 124, a power plant 122, an altitude controller 126, a transceiver 132, and other on-board equipment 130. The transceiver 132 is configured to wirelessly communicate data between the aerial vehicle 102 and the computing devices 104 and/or data sources 106 by way of the wireless communication link 108 and/or the communication link 110, respectively.

In addition to the aforementioned components, the gondola 114 also has affixed or otherwise coupled to it a ballast 120. The configuration of the ballast 120 suspended from the center of gravity at the bottom of the gondola 114 shown in FIG. 1 is provided by way of example and not limitation. Other configurations of coupling the ballast 120 to the aerial vehicle 102 are contemplated. For instance, in other embodiments, the ballast 120 may be coupled directly to the aerial vehicle 102 and/or may be coupled to various portions of the gondola 114. Further, while shown as a single component, the ballast 120 may be distributed into multiple separate components coupled to various positions and/or portions of the gondola 114 and/or the aerial vehicle 102. The ballast 120 may include or be composed of various materials, including small steel sand, other granular substances, liquids, and/or the like. As described further below, the computing devices 104 may cause the aerial vehicle 102 to decouple all or a portion of the ballast 120 during flight. For that purpose, the ballast 120 may include a valve, door, and/or any other relevant decoupling mechanism known to those skilled in the art.

In some embodiments, the sensors 128 include a global positioning system (GPS) sensor that senses and outputs location data, such as latitude, longitude, and/or altitude data corresponding to a latitude, longitude, and/or altitude of the aerial vehicle 102 in the Earth's atmosphere. The sensors 128 are configured to provide the location data to the computing devices 104 by way of the wireless transceiver 132 and the wireless communication link 108 for use in controlling the aerial vehicle 102, as described in further detail below.

The energy storage module 124 includes one or more batteries that store electrical energy provided by the solar panels 134 for use by the various components of the aerial vehicle 102. The power plant 122 obtains electrical energy stored by the energy storage module 124 and converts and/or conditions the electrical energy to a form suitable for use by the various components of the aerial vehicle 102.

The altitude controller 126 is configured to control the ballonets 116 to adjust the buoyancy of the aerial vehicle 102 to assist in controlling its position and/or movement during flight. As described in further detail below, in various embodiments the altitude controller 126 is configured to control the ballonets 116 based at least in part upon an altitude command that is generated by, and received from, the computing devices 104 by way of the wireless communication link 108 and the transceiver 132. In some examples, the altitude controller 126 is configured to implement the altitude command by causing the actuation of the ACS based on the altitude command.

The on-board equipment 130 may include a variety of types of equipment, depending upon the application or needs, as outlined above. For example, the on-board equipment 130 may include LTE transmitters and/or receivers, weather sensors, imaging equipment, and/or any other suitable type of equipment. In some embodiments, the on-board equipment may further include one or more processors, controllers, or entire computing devices similar to the computing devices 104.

Figure 2:
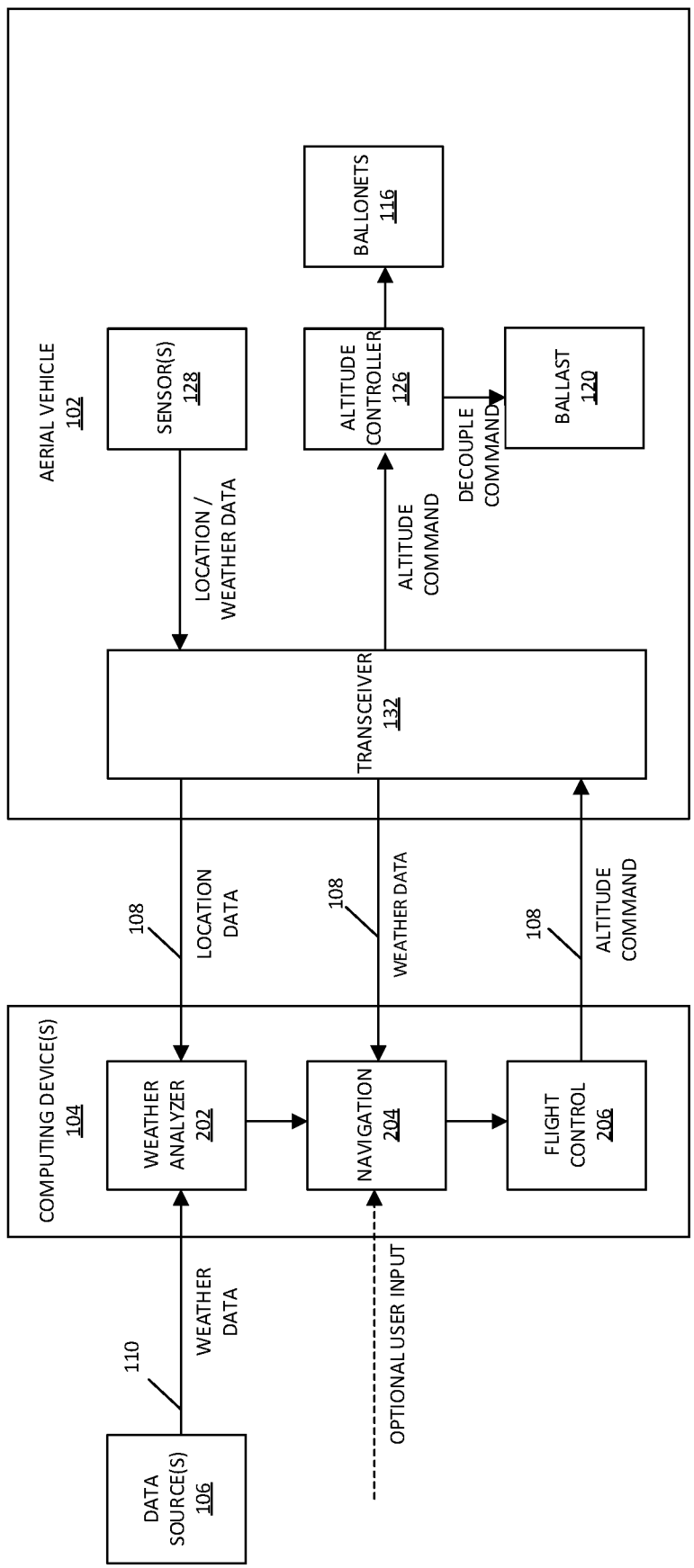
FIG. 2 is a schematic diagram showing additional aspects of the aerial vehicle system of FIG. 1, in accordance with an embodiment of the present disclosure.
Figure 4A:
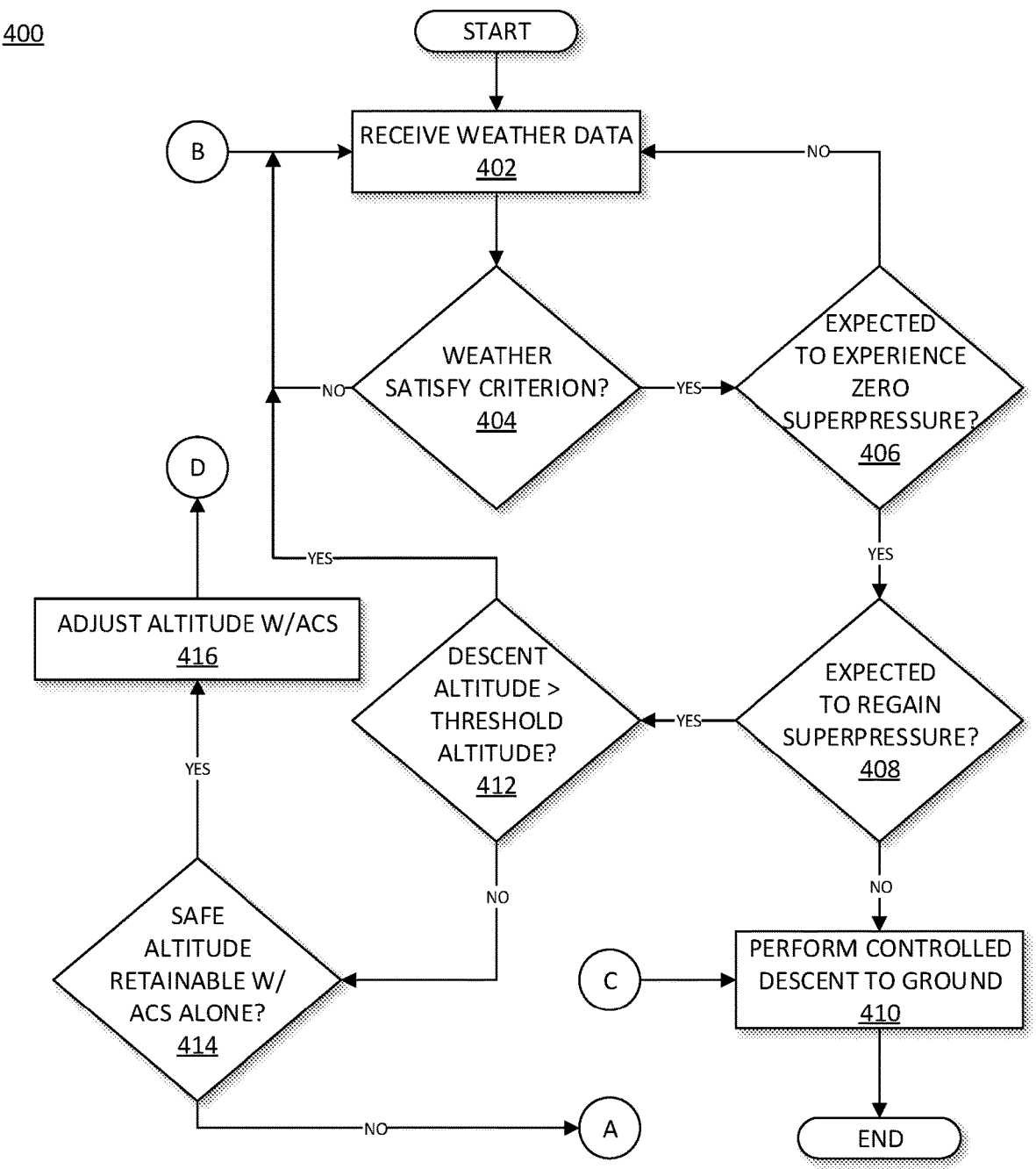
FIGS. 4A and 4B (collectively, FIG. 4) are a flowchart showing an illustrative method for controlling an aerial vehicle from the perspective of a computing device of FIG. 1, in accordance with an embodiment of the present disclosure.
Figure 4B:
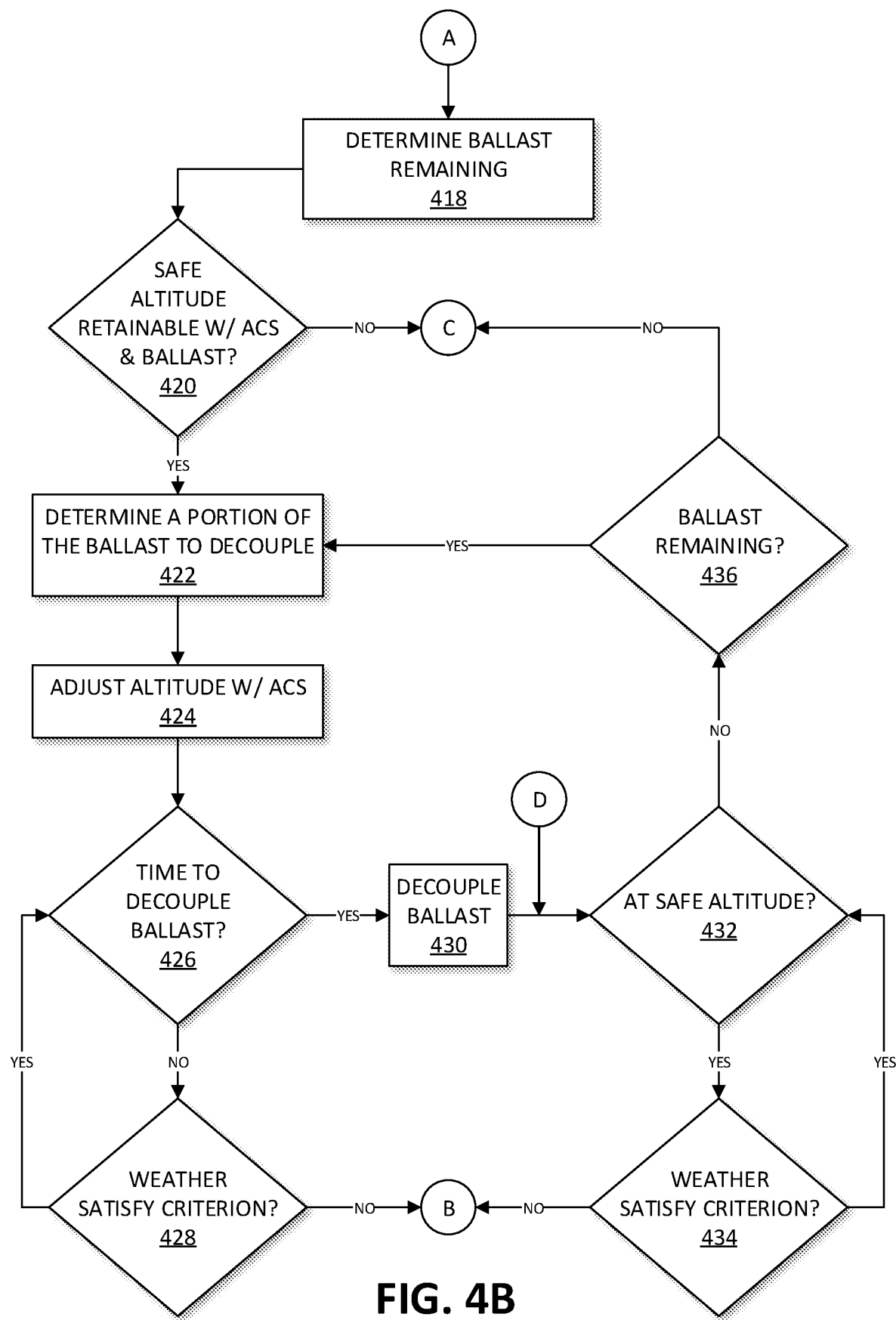

Having provided an overview of the aerial vehicle control system 100 in the context of FIG. 1, reference is now made to FIG. 2, which shows certain operations of the aerial vehicle control system 100, in accordance with an embodiment of the present disclosure. In particular, FIG. 2 illustrates an example embodiment of how functionality and corresponding components are allocated among the aerial vehicle 102, the computing devices 104, and/or the data sources 106, to control a position and/or movement of the aerial vehicle 102. Although more detailed aspects of how the system 100 implements control of the aerial vehicle 102 are provided below in the context of FIG. 4, FIG. 2 provides an overview of the functionality and component allocation. The arrangement of components depicted in FIG. 2 is provided by way of example and not limitation. Other arrangements of components and allocations of functionality are contemplated, for instance, with the aerial vehicle 102 including components that implement functionality shown in FIG. 2 as being implemented by the computing devices 104, or vice versa. However, in the example shown in FIG. 2, a majority of the components and functionality are allocated to the computing devices 104 instead of to the aerial vehicle 102, which decreases the amount of energy required to operate the components of the aerial vehicle 102 and thus enables the components of the aerial vehicle 102 to utilize a greater portion of the available energy than would be possible if more components and functionality were allocated to the aerial vehicle 102. This increases the capabilities of the aerial vehicle 102 for implementing functionality and/or providing services for a given amount of available energy.

In addition to certain components that were introduced above in connection with FIG. 1, FIG. 2 shows a weather analyzer module 202, a navigation module 204, and a flight control module 206 that are included within the computing devices 104. Once the aerial vehicle 102 is in flight in the atmosphere, the sensors 128 are configured to periodically transmit to the weather automation module 202, by way of the transceiver 132 and the wireless communication link 108, location data, such as timestamped GPS positions and altitudes of the aerial vehicle 102 at corresponding times. The weather analyzer module 202 utilizes the location data obtained from the sensors 128 and weather data, including ambient temperature conditions and/or predictions as well as current and/or expected upwelling infrared energy conditions, obtained from other data sources 106 (such as National Oceanic and Atmospheric Administration (NOAA) data sources, European Centre for Medium-Range Weather Forecasts (ECMWF) data sources, and/or the like) to infer or estimate the weather conditions in which the aerial vehicle 102 is flying or is expected to be flying. Weather data, including ambient temperature conditions as well as current upwelling infrared energy conditions, may also be obtained by sensors 128 and transmitted to the weather automation module 202, by way of the transceiver 132 and the wireless communication link 108. In particular, weather data are stored in the weather analyzer module 202, which constructs a kernel function, such as a Gaussian Process kernel function that assists the navigation module 204 in determining how to navigate the aerial vehicle 102 based on the inferred or estimated weather conditions, according to one or more predetermined navigation algorithms. Examples of types of navigation algorithms that may be implemented by the navigation module 204 are described in U.S. patent application Ser. Nos. 15/662,940, 15/662,968, 15/663,000, and 15/663,030, all entitled SYSTEMS AND METHODS FOR CONTROLLING AERIAL VEHICLES, filed on Jul. 28, 2017, by Candido et al., the entire contents of each of which are incorporated herein by reference. Depending upon the navigation algorithm being implemented, the navigation module 204 generates a flight plan, which is a set of locations (e.g., altitudes, latitude coordinates, and/or longitude coordinates) that the aerial vehicle 102 should attempt to attain at corresponding times. Based on the temperature and/or upwelling infrared energy predictions, the navigation module 204 may determine adjustments to the flight plan, as further described below. The navigation module 204 then registers the flight plan with the flight control module 206.

The flight control module 206 generates flight commands, such as altitude commands (e.g., an altitude to which the altitude of the aerial vehicle 102 should be adjusted), and sequentially transfers each flight command to the altitude controller 126 for implementation according to the corresponding times indicated in the flight plan. In particular, the flight control module 206 transmits to the transceiver 132, by way of the wireless communication link 108, an altitude command (for example, which may be specified as a barometric pressure, which may be equivalent to pressure altitude, and which indicates a desired altitude for the aerial vehicle 102 to maintain within some tolerance band) and/or a decouple command (for example, which may be a command to decouple all or a specified portion of the ballast 120). The altitude controller 126 is configured to execute an altitude loop whereby the altitude controller 126 periodically receives the altitude command and/or the decouple command from the computing devices 104 and executes those commands to control the altitude of the aerial vehicle 102.

Figure 3:
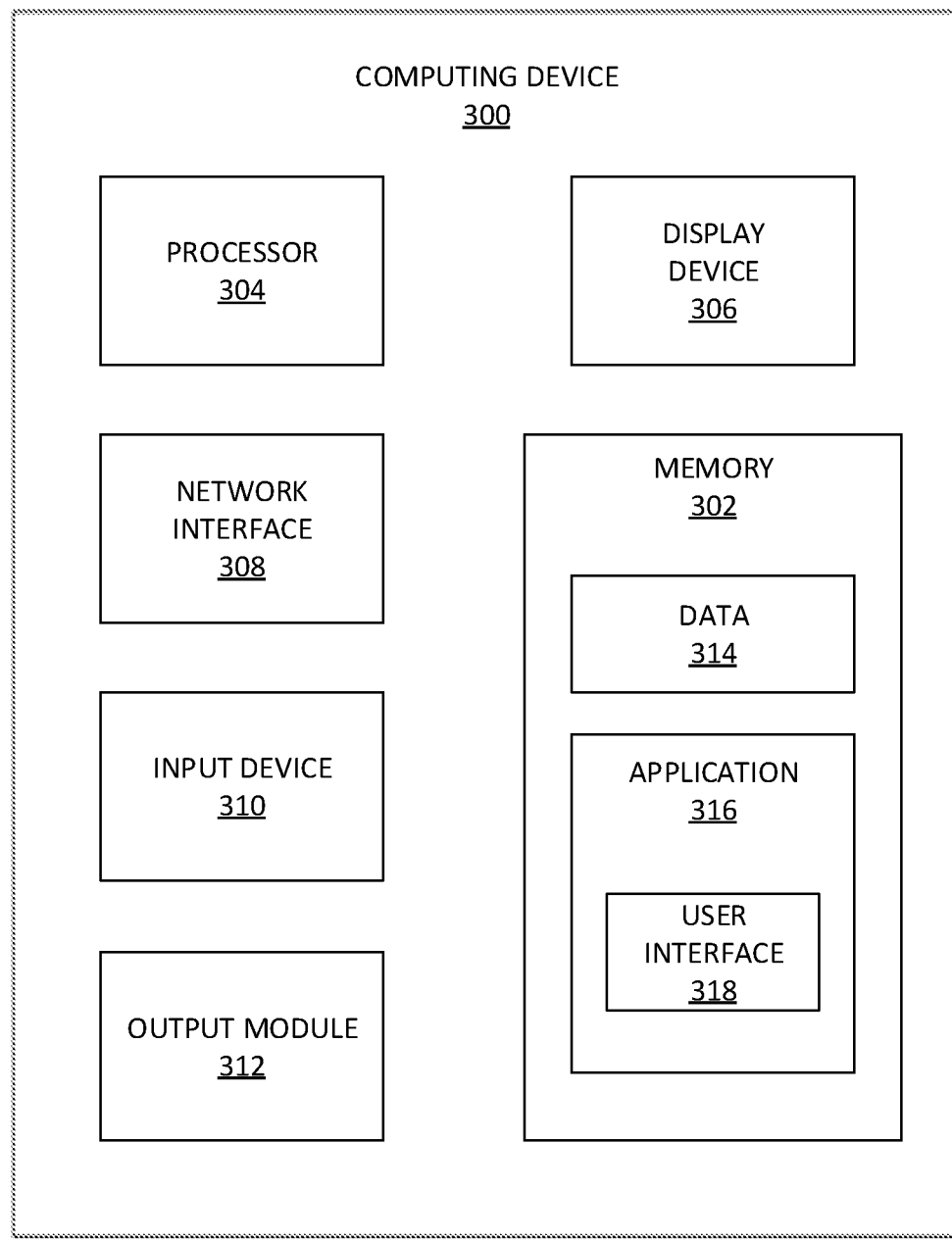
FIG. 3 is a schematic block diagram of an illustrative embodiment of a computing device that may be employed in various embodiments of the present system, for instance, as part of the system or components of FIG. 1 or 2, in accordance with an embodiment of the present disclosure.

FIG. 3 is a schematic block diagram of a computing device 300 that may be employed in accordance with various embodiments described herein. Although not explicitly shown in FIG. 1 or FIG. 2, in some embodiments, the computing device 300, or one or more of the components thereof, may further represent one or more components (e.g., the computing device 104, components of the gondola 114, the data sources 106, and/or the like) of the system 100. The computing device 300 may, in various embodiments, include one or more memories 302, processors 304, display devices 306, network interfaces 308, input devices 310, and/or output modules 312. The memory 302 includes non-transitory computer-readable storage media for storing data and/or software that is executable by the processor 304 and which controls the operation of the computing device 300. In embodiments, the memory 302 may include one or more solid-state storage devices such as flash memory chips. Alternatively, or in addition to the one or more solid-state storage devices, the memory 302 may include one or more mass storage devices connected to the processor 304 through a mass storage controller (not shown in FIG. 3) and a communications bus (not shown in FIG. 3). Although the description of computer readable media included herein refers to a solid-state storage, it should be appreciated by those skilled in the art that computer-readable storage media may be any available media that can be accessed by the processor 304. That is, computer readable storage media includes non-transitory, volatile and non-volatile, removable and non-removable media implemented in any method or technology for storage of information such as computer-readable instructions, data structures, program modules or other data. Examples of computer-readable storage media include RAM, ROM, EPROM, EEPROM, flash memory or other solid state memory technology, CD-ROM, DVD, Blu-Ray or other optical storage, magnetic cassettes, magnetic tape, magnetic disk storage or other magnetic storage devices, or any other medium which may be used to store the desired information and which can be accessed by computing device 300.

In some embodiments, the memory 302 stores data 314 and/or an application 316. In some aspects the application 316 includes a user interface component 318 that, when executed by the processor 304, causes the display device 306 to present a user interface, for example a graphical user interface (GUI) (not shown in FIG. 3). The network interface 308, in some embodiments, is configured to couple the computing device 300 and/or individual components thereof to a network, such as a wired network, a wireless network, a local area network (LAN), a wide area network (WAN), a wireless mobile network, a Bluetooth network, the Internet, and/or another type of network. The input device 310 may be any device by means of which a user may interact with the computing device 300. Examples of the input device 310 include without limitation a mouse, a keyboard, a touch screen, a voice interface, and/or the like. The output module 312 may, in various embodiments, include any connectivity port or bus, such as, for example, a parallel port, a serial port, a universal serial bus (USB), or any other similar connectivity port known to those skilled in the art.

Turning now to FIG. 4, there is shown a flowchart depicting an illustrative method 400 for controlling an aerial vehicle from the perspective of the computing devices 104 of the system 100, in accordance with an embodiment of the present disclosure. As described above, the computing device 104 include various components, including processors, memories, and various other modules. As will be appreciated by those skilled in the art, the processes described below may be performed and/or executed by a variety of these components. As such, the description that follows will refer to the processes being performed by the computing devices 104, but those skilled in the art will recognize that one or more of the above-described components of the computing devices 104 are used by the computing devices 104 to perform and/or execute these processes. Further, those skilled in the art will recognize that the processes described below may be a sub-process forming part of a bigger process for controlling aerial vehicles, and thus various other processes and steps may be performed in addition to the below-described steps and processes. While the processes described below are organized into an illustrative ordered sequence of steps, those skilled in the art will appreciate that various of these steps may be performed in a different order or sequence, repeated, and/or omitted without departing from the scope of the present disclosure.

A process for controlling an aerial vehicle, such as the aerial vehicle 102, using ballast may start at block 402, where the computing device 104 receives weather data from the data sources 106 and/or the sensors 128, by way of the transceiver 132. The weather data includes a predicted current and/or future ambient temperature as well as current and/or future upwelling infrared energy conditions, such as severe cloud cover, that the aerial vehicle 102 is expected to experience (as received from the data sources 106), and/or an actual temperature and/or upwelling infrared energy conditions being experienced by the aerial vehicle 102 (as received from the sensors 128). The weather data may further include predictions of solar flux incident on the aerial vehicle 102, as measured by the sensors 128.

At block 404, the computing devices 104 determine whether the weather data received at block 402, and particularly the ambient temperature and/or upwelling infrared energy conditions included in the weather data, satisfies a criterion. In embodiments, the criterion may be a threshold, such as a minimum temperature and/or upwelling infrared energy level at which the aerial vehicle 102 is able to maintain a preferred altitude. For example, the criterion may be a threshold temperature and/or infrared energy level corresponding to a lower end of a range of normal temperatures and/or infrared energy levels typically experienced by the aerial vehicle 102 during flight. If the computing devices 104 determine that the weather data does not satisfy the criterion ("NO" at block 404), processing returns to block 402 where the computing devices 104 receive new weather data. Alternatively, if the computing devices 104 determine that the weather data satisfies the criterion ("YES" at block 404), processing proceeds to block 406.

At block 406, the computing devices 104 determine whether the aerial vehicle 102 is expected to experience zero superpressure. As noted above, zero superpressure is a condition where the pressure that the atmospheric gas exerts on the outside of the lift gas balloon 112 and/or the ballonets 116 of the aerial vehicle 102 is greater than or equal to the pressure exerted by the lifting gas inside the lift gas balloon 112 and/or the air inside the ballonets 116. The computing devices 104 may determine whether the aerial vehicle 102 is expected to experience zero superpressure by using various formulas such as, for example, the formula described above. For example, the computing devices 104 may calculate a pressure of the lifting gas inside the aerial vehicle 102 based on the predicted temperature and/or upwelling infrared energy level included in the weather data received at block 402. If the computing devices 104 determine that the aerial vehicle 102 is not expected to experience zero superpressure ("NO" at block 406), processing returns to block 402, where the computing devices 104 again receive new weather data. Alternatively, if the computing devices 104 determine that the aerial vehicle 102 is expected to experience zero superpressure ("YES" at block 406), processing proceeds to block 408.

At block 408, the computing devices 104 determine whether the aerial vehicle 102 is expected to regain superpressure. As noted above, superpressure is the condition where the pressure exerted by the lifting gas inside the lift gas balloon 112 and/or the pressure exerted by the air inside the ballonets 116 is greater than the pressure exerted by the atmospheric gas on the outside of the lift gas balloon 112 and/or the ballonets 116, respectively. The computing devices 104 may determine whether the aerial vehicle 102 is expected to regain superpressure by comparing the pressure of the lifting gas inside the aerial vehicle 102 calculated at block 406 to an ambient pressure at one or more threshold altitudes. Examples of threshold altitudes include sea level, relative ground level, and/or one or more altitudes above ground level, etc. If the pressure calculated at block 406 is greater than the ambient pressure at the threshold altitude, the computing devices 104 may determine that the aerial vehicle 102 is expected to regain superpressure. If the computing devices 104 determine that the aerial vehicle 102 is not expected to regain superpressure ("NO" at block 408), processing proceeds to block 410, where the computing devices 104 send a command to the aerial vehicle 102, via the communication link 108 and the transceiver 132, to descend to the ground, whereafter processing of the method 400 ends. Alternatively, if the computing devices 104 determine that the aerial vehicle 102 is expected to regain superpressure ("YES" at block 408), processing proceeds to block 412.

At block 412, the computing devices 104 determine whether an altitude to which the aerial vehicle is expected to descend (the "descent altitude") while experiencing zero superpressure is greater (higher) than a threshold altitude. The computing devices 104 may first determine the descent altitude by using various formulas such as, for example, the formula described above. For example, the computing devices 104 may calculate an altitude at which the pressure of the lifting gas inside the lift gas balloon 112 and/or the air inside the ballonets 116 will again be greater than the pressure exerted by the atmospheric gas on the outside of the lift gas balloon 112 and/or the ballonets 116, respectively. The computing devices 104 may then compare the descent altitude to the threshold altitude. The threshold altitude may be a predetermined lower limit altitude at which the aerial vehicle 102 may safely operate. For example, the threshold altitude may be 60,000 feet above sea level, which is the upper limit of controlled airspace for commercial aircraft. If the computing devices 104 determine that the descent altitude is greater (higher) than the threshold altitude ("YES" at block 412), processing returns to block 402, where the computing devices 104 again receive new weather data. Alternatively, if the computing devices 104 determine that the descent altitude is not greater (that is, if the descent altitude is lower) than the threshold altitude ("NO" at block 412), processing proceeds to block 414.

At block 414, the computing devices 104 determine whether the aerial vehicle 102 is expected to be able to remain afloat at a safe altitude by using only the ACS. In embodiments, the safe altitude may be any altitude that is higher than the threshold altitude. The computing devices 104 may determine whether the aerial vehicle 102 is able to remain afloat at the safe altitude using only the ACS by using various formulas such as, for example, the ideal gas law formula described above. For example, the computing devices 104 may calculate an amount of lifting gas necessary for the aerial vehicle 102 to float at the safe altitude. The computing devices 104 may then calculate a difference between the amount of lifting gas necessary to float at the safe altitude and the amount of lifting gas currently inside the aerial vehicle. Thereafter, the computing devices 104 may determine whether the aerial vehicle 102, using the ACS, is expected to be able to pump an amount of air corresponding to the determined difference into the ballonets 116 before a time at which the aerial vehicle 102 is expected to descend below the threshold altitude, and thus keep the aerial vehicle 102 afloat at a safe altitude. If the computing devices 104 determine that the aerial vehicle 102 is expected to be able to remain afloat at a safe altitude using only the ACS ("YES" at block 414), processing proceeds to block 416. Alternatively, if the computing devices 104 determine that the aerial vehicle 102 is not expected to be able to remain afloat at a safe altitude using only the ACS ("NO" at block 414), processing proceeds to block 418.

At block 416, the computing devices 104 send a command, via the communication link 108 and the transceiver 132, to the altitude controller 126 of the aerial vehicle 102 to adjust the altitude of the aerial vehicle 102 using the ACS. In embodiments, the command may include a pressure to which the pressure of the lifting gas inside the aerial vehicle 102 should be increased. Additionally or alternatively, the command may include an amount of gas (e.g., air) which the ACS should pump into the ballonets 116 regardless of the pressure currently exerted by the lifting gas because that pressure is expected to decrease as the temperature of the air inside the ballonets 116 and/or the lifting gas inside the lifting gas balloon 112 decreases. In other embodiments, the computing devices 104 may not send a command at all, and instead the altitude controller 126 of the aerial vehicle 102 may determine to pump air into the ballonets 116 as the pressure of the air inside the ballonets 116 and/or the lifting gas inside the lifting gas balloon 112 starts to decrease as the temperature of the air inside the ballonets 116 and/or the lifting gas inside the lifting gas balloon 112 decreases. In some embodiments, the computing devices 104 may wait a predetermined or dynamically determined period of time before sending the command. Thereafter, processing proceeds to block 432.

At block 418, the computing devices 104 determine an amount of the ballast 120 that is coupled to the aerial vehicle 102. The determination may be based on a weight of the ballast 120 and/or a record of how much ballast was coupled to the aerial vehicle 102 at launch and how much of the ballast 120 has been previously decoupled during the flight of the aerial vehicle 102. Thereafter, processing proceeds to block 420.

At block 420, the computing devices 120 determine whether the aerial vehicle 102 is expected to be able to remain afloat at a safe altitude by using the ACS and by decoupling at least a portion of the ballast 120. The computing devices 104 may determine whether the aerial vehicle 102 is able to remain afloat at the safe altitude using the ACS decoupling a portion of the ballast 120 by using various formulas such as, for example, the formula described above. For example, the computing devices 104 may first determine how much of the ballast 120 can be decoupled before a time at which the aerial vehicle 102 is expected to descend below the threshold altitude, and may then determine a difference between the pressure of the lifting gas inside the aerial vehicle 102 with the ballast 120 unchanged and the expected pressure of the lifting gas inside the aerial vehicle 102 with the ballast 120 decoupled. For example, each kilogram (kg) of the ballast 120 decoupled may increase the pressure of the lifting gas inside the aerial vehicle 102 by an amount approximately equal to the pressure added by pumping an additional 40 moles of air into the ballonets 116. The computing devices 104 may then determine whether the expected increase in pressure of the lifting gas inside the aerial vehicle 102 resulting from decoupling the ballast 120, in combination with the amount of air the aerial vehicle 102, using the ACS, is expected to be able to pump into the ballonets 116 before a time at which the aerial vehicle 102 is expected to descend below the threshold altitude, as determined at block 414, is expected to keep the aerial vehicle 102 afloat at a safe altitude. If the computing devices 104 determine that the aerial vehicle 102 is expected to be able to remain afloat at a safe altitude using the ACS and by decoupling at least a portion of the ballast 120 ("YES" at block 420), processing proceeds to block 422. Alternatively, if the computing devices 104 determine that the aerial vehicle 102 is not expected to be able to remain afloat at a safe altitude using the ACS and by decoupling the ballast 120 ("NO" at block 420), processing proceeds to block 410.

At block 422, the computing devices 104 determine a portion of the ballast 120 to decouple. In embodiments, the computing devices 104 may determine a minimum portion or amount of the ballast 120 to decouple which, in combination with the amount of air expected to be pumped into the ballonets 116 by the ACS, is expected to keep the aerial vehicle 102 afloat at a safe altitude.

Thereafter, at block 424, the computing devices 104 send a command, via the communication link 108 and the transceiver 132, to the altitude controller 126 of the aerial vehicle 102 to adjust the altitude of the aerial vehicle 102 using the ACS. The command may be similar to the command described above with reference to block 416. And similar to block 416, in some embodiments, the computing devices 104 may not send a command at all, and instead the altitude controller 126 of the aerial vehicle 102 may determine to pump air into the ballonets 116 as the pressure of the lifting gas inside the balloon starts to decrease as the temperature of the air inside the ballonets 116 and/or the lifting gas inside the lift gas balloon 112 decreases. In some embodiments, the computing devices 104 may wait a predetermined or dynamically determined period of time before sending the command. Thereafter, processing proceeds to block 426.

At block 426, the computing devices 104 determine whether it is time to decouple the portion of the ballast 120 determined at block 422. In embodiments, the computing devices 104 may be configured to delay decoupling of the portion of the ballast 120 for a period of time. For example, the computing devices 104 may delay decoupling the portion of the ballast 120 until a time whereafter decoupling of the portion of the ballast 120 will no longer be sufficient to keep the aerial vehicle afloat at a safe altitude. If the computing devices 104 determine that it is not time to decouple the portion of the ballast 120 ("NO" at block 426), processing proceeds to block 428. Alternatively, if the computing devices 104 determine that it is time to decouple the portion of the ballast 120 ("YES" at block 426), processing proceeds to block 430.

At block 428, the computing devices 104 receive new weather data and determine whether the new weather data satisfies the criterion. The new weather data may be received from the data sources 106 and may reflect updated weather predictions. Additionally or alternatively, the weather data may be received from the sensors 128, for example temperature sensors and/or infrared energy sensors, coupled to the aerial vehicle 102, and may reflect a current ambient temperature and/or amount of upwelling infrared energy experienced by the aerial vehicle 102. The determination may be similar to the determination described above with reference to block 404. If the computing devices 104 determine that the new weather data satisfies the criterion ("YES" at block 428), processing returns to block 426, where the computing devices 104 again determine whether it is time to decouple the portion of the ballast 120. Alternatively, if the computing devices 104 determine that the new weather data does not satisfy the criterion ("NO" at block 428), processing returns to block 402.

At block 430, the computing devices 104 send a command, via the communication link 108 and the transceiver 132, to the altitude controller 126 of the aerial vehicle 102 to decouple the portion of the ballast 120 determined at block 422. Thereafter, processing proceeds to block 432.

At block 432, the computing devices 104 determine whether the aerial vehicle 102 is floating at a safe altitude. For example, the computing devices 104 may determine whether the pressure of the lifting gas inside the aerial vehicle 102 corresponds to an ambient pressure at a safe altitude. If the computing devices 104 determine that the aerial vehicle 102 is floating at a safe altitude ("YES" at block 432), processing proceeds to block 434. Alternatively, if the computing devices 104 determine that the aerial vehicle 102 is not floating at a safe altitude ("NO" at block 432), processing proceeds to block 436.

At block 434, the computing devices 104 again receive new weather data and determine whether the new weather data satisfies the criterion. Similar to block 428, the new weather data may be received from the data sources 106 and may reflect updated weather predictions. Additionally or alternatively, the weather data may be received from the sensors 128, for example temperature sensors and/or infrared energy sensors, coupled to the aerial vehicle 102, and may reflect a current ambient temperature and/or amount of upwelling infrared energy experienced by the aerial vehicle 102. The determination may be similar to the determination described above with reference to block 404. If the computing devices 104 determine that the new weather data does not satisfy the criterion ("NO" at block 434), processing returns to block 402. Alternatively, if the computing devices 104 determine that the new weather data satisfies the criterion ("YES" at block 434), processing returns to block 432.

At block 436, the computing devices 104 determine whether at least a portion of the ballast 120 remains coupled to the aerial vehicle. If the computing devices 104 determine that at least a portion of the ballast 120 remains coupled to the aerial vehicle 102 ("YES" at block 436), processing returns to block 422. Alternatively, if the computing devices 104 determine that none of the ballast 120 remains coupled to the aerial vehicle 102, processing proceeds to block 410.

Figure 5:
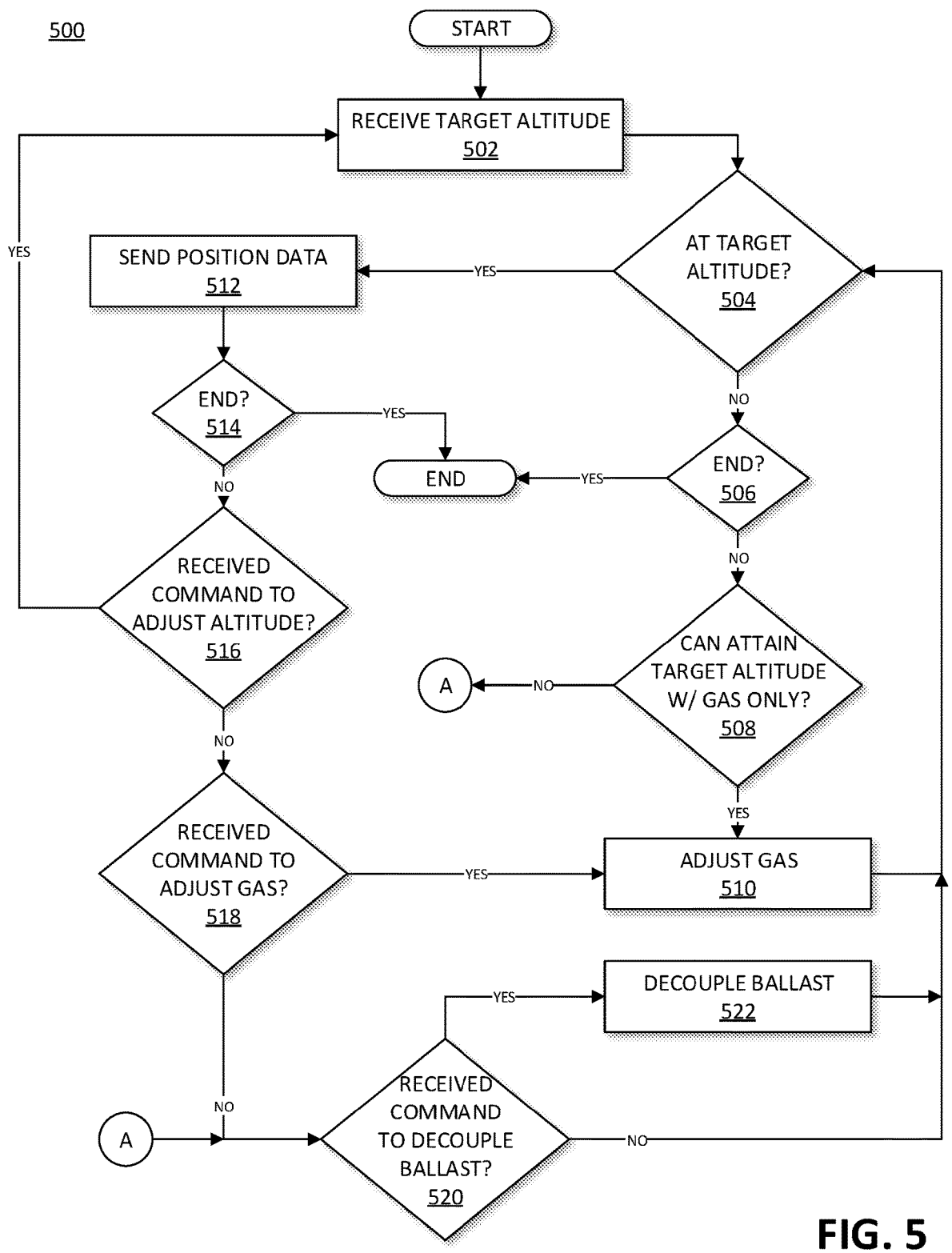
FIG. 5 is a flowchart showing an illustrative method for controlling an aerial vehicle from the perspective of the aerial vehicle of FIG. 1, in accordance with an embodiment of the present disclosure.

FIG. 5 is a flowchart showing an illustrative method 500 for controlling an aerial vehicle, from the perspective of the aerial vehicle 102, in accordance with an embodiment of the present disclosure. As described above with reference to FIG. 4, those skilled in the art will recognize that the processes described below may be a sub-process forming part of a bigger process for controlling aerial vehicles, and thus various other processes and steps may be performed in addition to the below-described steps and processes. While the processes described below are organized into an illustrative ordered sequence of steps, those skilled in the art will appreciate that various of these steps may be performed in a different order or sequence, repeated, and/or omitted without departing from the scope of the present disclosure.

At block 502, the aerial vehicle 102 receives, by way of the wireless communication link 108 and the transceiver 132, navigation data from the flight control module 206 of the computing device 104. The aerial vehicle 102 periodically receives multiple transmissions of navigation data from the computing device 104, as described above. The navigation data may include a target altitude.

At block 504, the altitude controller 126 determines whether the aerial vehicle 102 is floating at the target altitude. In embodiments, the altitude controller 126 obtains from the sensors 128 location data, including altitude data, indicating a current altitude, of the aerial vehicle 102. As described above, the altitude of the aerial vehicle 102 may correspond to, and thus be determined based on, a pressure of the lifting gas inside the aerial vehicle 102. As such, in some embodiments, the altitude controller 126 may receive data from the sensors 128 indicating the pressure of the lifting gas inside the aerial vehicle 102, and may determine the altitude of the aerial vehicle 102 based on the pressure data. If the altitude controller 126 determines that the aerial vehicle 102 is floating at the target altitude ("YES" at block 504), processing proceeds to block 512. Alternatively, if the altitude controller 126 determines that the aerial vehicle 102 is not floating at the target altitude ("NO" at block 504), processing proceeds to block 506.

At block 506, the altitude controller 126 determines whether the aerial vehicle 102 should end its flight and descend to the ground. For example, the altitude controller 126 may determine whether the aerial vehicle 102 has reached the end of its flight, or is unable to maintain the target altitude. If the altitude controller 126 determines that the aerial vehicle 102 should end its flight ("YES" at block 506), processing ends and a controlled descent is initiated in the manner described above. Alternatively, if the altitude controller 126 does not determine that the aerial vehicle 102 should end its flight ("NO" at block 506), processing proceeds to block 508.

At block 508, the altitude controller 126 determines whether the aerial vehicle 102 can attain the target altitude received at block 502 by adjusting (for example by pumping air into or out of) the ballonets 116. If the altitude controller 126 determines that the aerial vehicle 102 can attain the target altitude by adjusting the amount of air in the ballonets 116 ("YES" at block 508), processing proceeds to block 510. Alternatively, if the altitude controller 126 determines that the aerial vehicle 102 cannot attain the target altitude by adjusting the amount of air in the ballonets 116 ("NO" at block 504), processing proceeds to block 520.

At block 510, the altitude controller 126 operates the pump and/or valve coupled to the ballonets 116 to adjust the amount of air in the ballonets 116. Thereafter, processing returns to block 504.

At block 512, the aerial vehicle 102, via the transceiver 132 and the communication link 108, sends position data, including altitude data, to the computing devices 104. Thereafter, at block 514, the altitude controller 126 determines whether the aerial vehicle 102 should end its flight and descend to the ground. For example, the altitude controller 126 may determine whether the aerial vehicle 102 has reached the end of its flight. If the altitude controller 126 determines that the aerial vehicle 102 should end its flight ("YES" at block 514), processing ends. Alternatively, if the altitude controller 126 does not determine that the aerial vehicle 102 should end its flight ("NO" at block 514), processing proceeds to block 516.

At block 516, the altitude controller 126 determines whether the aerial vehicle 102 has received a new command to adjust its altitude. If the altitude controller 126 determines that the aerial vehicle 102 has received a new command to adjust its altitude ("YES" at block 516), processing returns to block 502. Alternatively, if the altitude controller 126 determines that the aerial vehicle 102 has not received a new command to adjust its altitude ("NO" at block 516), processing proceeds to block 518.

At block 518, the altitude controller 126 determines whether the aerial vehicle 102 has received a command to adjust the amount of air in the ballonets 116. If the altitude controller 126 determines that the aerial vehicle 102 has received a command to adjust the amount of air in the ballonets 116 ("YES" at block 518), processing proceeds to block 510. Alternatively, if the altitude controller 126 determines that the aerial vehicle 102 has not received a command to adjust the amount of air in the ballonets 116 ("NO" at block 518), processing proceeds to block 520.

At block 520, the altitude controller 126 determines whether the aerial vehicle 102 has received a command to decouple a portion of the ballast 120. If the altitude controller 126 determines that the aerial vehicle 102 has received a command to decouple a portion of the ballast 120 ("YES" at block 520), processing proceeds to block 522 where the altitude controller 126 operates a valve, door, or other decoupling mechanism, to decouple the portion of the ballast 120. Thereafter, or if the altitude controller 126 determines that the aerial vehicle 102 has not received a command to decouple a portion of the ballast 120 ("NO" at block 520), processing returns to block 504.

As can be appreciated in view of the present disclosure, the systems and methods described herein provide advancements in aerial vehicle pressure differential management that enable aerial vehicles to be more resilient and withstand adverse weather conditions, thereby increasing their usable lifetime. The embodiments disclosed herein are examples of the present systems and methods and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present information systems in virtually any appropriately detailed structure. Like reference numerals may refer to similar or identical elements throughout the description of the figures.

The phrases "in an embodiment," "in embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

The systems and/or methods described herein may utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms. In example embodiments that employ a combination of multiple controllers and/or multiple memories, each function of the systems and/or methods described herein can be allocated to and executed by any combination of the controllers and memories.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

Any of the herein described methods, programs, algorithms or codes may be contained on one or more non-transitory computer-readable or machine-readable media or memory. The term "memory" may include a mechanism that provides (in an example, stores and/or transmits) information in a form readable by a machine such a processor, computer, or a digital processing device. For example, a memory may include a read only memory (ROM), random access memory (RAM), magnetic disk storage media, optical storage media, flash memory devices, or any other volatile or non-volatile memory storage device. Code or instructions contained thereon can be represented by carrier wave signals, infrared signals, digital signals, and by other like signals.

The foregoing description is only illustrative of the present systems and methods. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. A system for controlling an aerial vehicle, the system comprising:
   an aerial vehicle;
   a ballast coupled to the aerial vehicle; and
   a server communicatively coupled to the aerial vehicle by means of a wireless communication link, the server including a processor and a memory storing instructions which, when executed by the processor, cause the server to:
      receive weather data comprising one or both of a current and predicted future weather condition,
      determine that an aspect of the weather data satisfies a predetermined criterion, and
      cause the aerial vehicle to decouple at least a portion of the ballast based on the determination that the aspect of the weather data satisfies the predetermined criterion.

2. The system according to claim 1, wherein the determining that the aspect of the weather data satisfies the predetermined criterion includes determining that a temperature metric included in the weather data is below a predetermined threshold.

3. The system according to claim 2, wherein the instructions, when executed by the processor, further cause the server to determine the portion of the ballast to decouple based on an amount by which the temperature metric is below the predetermined threshold.

4. The system according to claim 3, wherein the determining of the portion of the ballast to decouple is further based on an altitude of the aerial vehicle.

5. The system according to claim 2, wherein the predetermined threshold is based on an altitude of the aerial vehicle and an amount of gas inside the aerial vehicle.

6. The system according to claim 1, wherein the determining that the aspect of the weather data satisfies the predetermined criterion includes determining that a temperature of gas inside the aerial vehicle is expected to cause the aerial vehicle to experience zero superpressure.

7. The system according to claim 6, wherein determining that the temperature of gas inside the aerial vehicle is expected to cause the aerial vehicle to experience zero superpressure includes determining that a level of infrared radiation experienced at an altitude of the aerial vehicle is expected to cause a temperature of the gas inside the aerial vehicle to drop below a predetermined threshold.

8. The system according to claim 7, wherein the predetermined threshold is determined based on an amount of gas inside the aerial vehicle.

9. The system according to claim 7, wherein the instructions, when executed by the processor, further cause the server to determine the portion of the ballast to decouple based on an amount of gas inside the aerial vehicle.

10. The system according to claim 9, wherein the determining of the portion of the ballast to decouple is further based on the altitude of the aerial vehicle.

11. The system according to claim 6, wherein the instructions, when executed by the processor, further cause the server to determine whether the aerial vehicle is expected to recover from experiencing zero superpressure.

12. The system according to claim 11, wherein the instructions, when executed by the processor, further cause the server to determine an altitude to which the aerial vehicle is expected to descend while the aerial vehicle experiences zero superpressure.

13. The system according to claim 12, wherein the instructions, when executed by the processor, further cause the server to determine whether the altitude to which the aerial vehicle is expected to descend while the aerial vehicle experiences zero superpressure is above a minimum altitude.

14. The system according to claim 13, wherein the instructions, when executed by the processor, further cause the server to cause the aerial vehicle to descend to the ground prior to experiencing zero superpressure in response to a determination that the altitude to which the aerial vehicle is expected to descend while the aerial vehicle experiences zero superpressure is not above the minimum altitude.

15. The system according to claim 1, wherein the weather data is received from an external source.

16. The system according to claim 1, wherein the weather data is received from a sensor coupled to the aerial vehicle.

17. The system according to claim 1, wherein the aerial vehicle includes a balloon.

18. The system according to claim 1, wherein the ballast is composed of a granular substance.

19. A method for controlling an aerial vehicle, the method comprising:
- receiving, by a server, weather data comprising one or both of a current and predicted future weather condition;
- determining, by the server, that an aspect of the weather data satisfies a predetermined criterion; and
- causing, by the server and a wireless communication link communicatively coupling the server to the aerial vehicle, the aerial vehicle to decouple at least a portion of a ballast coupled to the aerial vehicle based on the determination that the aspect of the weather data satisfies the predetermined criterion.

20. A non-transitory computer-readable storage medium storing instructions which, when executed by a processor, cause a computing device to:
- receive weather data comprising one or both of a current and predicted future weather condition;
- determine that an aspect of the weather data satisfies a predetermined criterion; and
- cause the aerial vehicle to decouple at least a portion of a ballast coupled to the aerial vehicle based on the determination that the aspect of the weather data satisfies the predetermined criterion.

* * * * *